United States Patent [19]

Severin et al.

[11] 4,287,839

[45] Sep. 8, 1981

[54] APPARATUS FOR LINING THE INNER WALLS OF INDUSTRIAL FURNACES

[75] Inventors: Manfred Severin, Schwerte-Geisecke; Hans-Dieter Marsch, Dortmund, both of Fed. Rep. of Germany

[73] Assignee: Uhde GmbH, Dortmund, Fed. Rep. of Germany

[21] Appl. No.: 98,929

[22] Filed: Nov. 30, 1979

[30] Foreign Application Priority Data

Dec. 28, 1978 [DE] Fed. Rep. of Germany ....... 2856441

[51] Int. Cl.[3] .......................... E04B 1/80; C04B 43/02

[52] U.S. Cl. .................................... 110/331; 110/336; 266/286; 52/486; 52/506

[58] Field of Search ................................ 110/338-340, 110/336, 331; 432/252.3, 249; 266/280, 283, 286; 52/486, 511, 506

[56] References Cited

U.S. PATENT DOCUMENTS

| | | | |
|---|---|---|---|
| 1,610,578 | 12/1926 | Murphy | 52/486 |
| 2,517,876 | 8/1950 | Hener | 110/339 |
| 2,982,237 | 5/1961 | Copeland et al. | 110/339 |
| 3,182,765 | 5/1965 | Kwiatkowski | 52/506 |
| 3,359,697 | 12/1967 | Smith et al. | 52/506 |
| 3,400,672 | 9/1968 | Dickson | 52/506 |
| 3,824,936 | 7/1974 | Merkle, Jr. | 110/338 |
| 3,892,396 | 7/1975 | Monaghan | 266/286 |
| 3,940,244 | 2/1976 | Sander et al. | 110/336 |
| 3,952,470 | 4/1976 | Byrd, Jr. | 52/511 |
| 4,001,996 | 1/1977 | Byrd, Jr. | 52/511 |
| 4,012,877 | 3/1977 | Byrd, Jr. | 52/511 |
| 4,088,825 | 5/1978 | Carr | 110/336 |
| 4,148,165 | 4/1979 | Watanabe et al. | 110/336 |
| 4,222,338 | 9/1980 | Adams | 110/336 |

*Primary Examiner*—Henry C. Yuen
*Attorney, Agent, or Firm*—Wilson, Fraser, Barker & Clemens

[57] ABSTRACT

The invention relates to an apparatus for lining the inner walls of industrial furnaces with a plurality of insulating blocks, each block comprising an insulating mat which is folded in corrugated manner and possibly stitched in this shape, the insulating mats being made of highly heat-resistant material, especially ceramic fibrous material, with carrying elements arranged on the outside of the corrugations, the carrying elements being equipped on the outside of the insulating blocks with fixing means to allow each individual insulating block to be fixed to the furnace wall.

6 Claims, 3 Drawing Figures

APPARATUS FOR LINING THE INNER WALLS OF INDUSTRIAL FURNACES

BACKGROUND OF THE INVENTION

In a known apparatus of this type (DE-OS No. 26 35 623), the carrying elements comprise carrying sections embedded in at least two outer ends of the corrugations, with a web fixed to the center of each carrying section and extending through an appropriate opening in the insulating mat to the outer side of the insulating block where it passes through an opening in a fixing bar arranged transversely to the fibers of the mat and, by being bent into the plane of the fixing bar is made capable of being joined to the latter. The fixing bar itself can be slid laterally into a C-shaped holding element which can be joined to the furnace wall, an opening being provided in the C-shaped holding element for a fixing bolt or similar means for the purpose of joining the C-shaped holding element to the furnace wall. An opening is likewise provided in the fixing bar which can be slid into the C-shaped holding element, said opening being capable of being lined up with the opening in the C-shaped holding element, thus making the fixing means that pass through the C-shaped holding element accessible when a corresponding opening has been made in the insulating mat at the opposite end to the above openings. With this particular configuration, a defect in any insulating block makes it necessary to shut down the furnace and allow it to cool in order then to be able to unscrew the fixing bolts passing through the insulating mat in the manner described above from the inside of the furnace, and having removed one insulating block it also being possible to remove and replace other insulating blocks by sliding the fixing bars sideways out of the C-shaped holding elements.

In another known apparatus (DE-OS No. 22 31 658), a plurality of fiber mats are joined by carrying rods that penetrate all plates and which are bent at right angles at their ends, the carrying rods being fixed to a block or refractory material by means of U-shaped fixing elements, the block being provided with a central opening into which a metallic fixing bolt can be inserted from the inside of the block, said bolt being joined to the metallic wall of the furnace by means of an electric-arc welding apparatus at one end, the other end being threaded and joined to the block of refractory material by screwing into an accessory disk. This known apparatus likewise requires that the furnace be entered for replacing a defective insulating block and, consequently, that the furnace be shut down for this purpose and allowed to cool.

SUMMARY OF THE INVENTION

The aim of the invention is to find a means of easily replacing individual defective insulating blocks from outside the furnace without interrupting the operation of the furnace, while ensuring that each individual block is dimensionally stable and easy to handle.

In an apparatus of the type mentioned above this aim is achieved in that each insulating block is equipped on its outer side with a base plate which is, in turn, equipped with at least two webs located at opposite ends of the plate and bent outwards such as to permit adjacent insulating blocks to be joined in the manner of cassettes by means of fixing bolts extending through said webs and that the base plate serves as the connecting element between the carrying elements for the folded insulating mat and the fixing means.

With an appropriate design of the furnace wall, i.e., partial removability of the same in a manner as to render individual defective insulating blocks accessible from the outside, this configuration permits each individual block to be removed towards the outside by unscrewing the fixing bolts passing through the base plate webs of adjacent insulating blocks and replaced by a new insulating block, without having to shut down the furnace for this purpose, since it is possible to carry out appropriate preparations which will reduce the time required for the replacement of a defective insulating block by a new block to a few seconds. Moreover, the base plate which connects the carrying elements for the insulating mat with the means for joining the fixing means to the furnace wall imparts an excellent dimensional stability to each insulating mat both prior to and during assembly and, in addition, the mounting webs integral to the base plate guarantee that the lining, particularly in its fully assembled state, is both safe and regular in shape.

A particular advantage can be achieved with this configuration if the fixing means comprise hooks that are so attached to the base plate that they are capable of rotation and which can be hooked into holding assemblies, especially if these are in the form of continuous bars, provided on the furnace wall.

In order to prevent the inadvertent detachment of individual insulating blocks, e.g., in case of minor explosions within the furnace, it is recommendable that each fixing hook be provided with a retaining device, the construction being quite simple if such a retaining device is in the form of a locking bar that can be inserted between the fixing means and the web of an adjoining base plate, with said locking bar being inserted after the fixing hook has been hooked in and being removed before the fixing hook is unhooked.

The carrying elements for the folded insulating mat can further comprise at least two carrying bars that penetrate all the folds of the insulating mat and which can be connected to the base plate, such that all folds of the insulating mats are securely held together and, in particular, such that the end folds are prevented from dropping away from the carrying bars, as might occur with the insulating block carrying bars that are simply bent over at the ends at taught by DE-OS No. 22 31 658.

In addition, it is easily possible to secure a known damping or compensating element of highly heat-resistant material between opposite base plate webs of adjacent insulating blocks. In the known apparatus according to DE-OS No. 22 31 658, such damping or compensating elements are simply inserted between the individual insulating blocks and, consequently, are not reliably secured, whereas the device between the touching base plate webs of adjacent insulating blocks according to the invention ensures that the damping and compensating element is reliably clamped and secured by the fixing bolts that pass through the base plate webs and the element itself.

It is recommended to hold each insulating mat in folded state by means of bands that facilitate its assembly on the associated base plate; such bands may consist of material that is not heat-resistant, since said bands can be allowed to burn off after installation.

Finally, each insulating mat can comprise several layers, the layers having different heat resistances, the heat resistance of the layer closest to the furnace wall having the highest heat resistance, the purpose of this measure being to reduce the manufacturing cost, since all insulating materials become progressively more expensive as their heat resistance increases.

BRIEF DESCRIPTION OF THE DRAWINGS

In the following, the invention is described in more detail with the aid of the drawings, where.

DESCRIPTION OF THE PREFERRED EMBODIMENT

Figure 1:
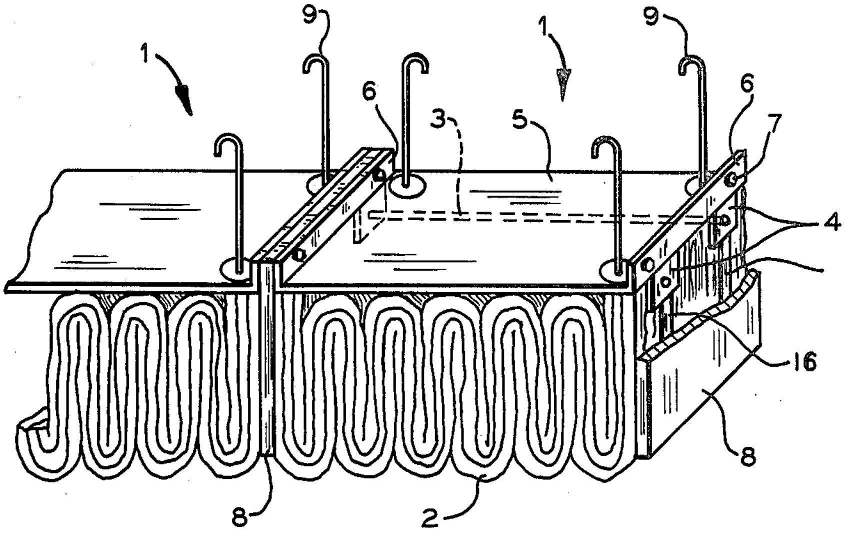
FIG. 1 is a perspective view of an apparatus according to the invention with two adjacent insulating blocks in perspective.
Figure 2:
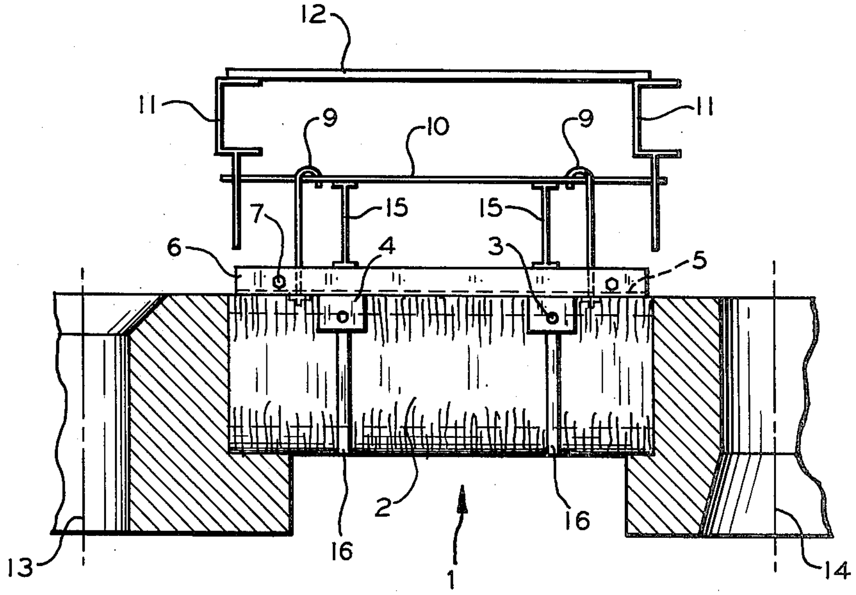
FIG. 2 is a side view of an insulating block installed in a furnace roof.

The insulating blocks (1) shown in FIGS. 1 and 2 comprise a corrugated or meandering insulating mat (2) consisting of several layers of temperature-resistant ceramic fibrous material, the layer having progressively higher temperature resistances towards the inside of the furnace, i.e., in FIGS. 1 and 2, the lowermost layer has the highest temperature resistance.

Each insulating mat (2) is penetrated somewhat below the extreme ends of the folds by two carrying bars (3) which are bolted or otherwise fixed to lugs (4) which are, in turn, joined to a base plate (5) preferably made of steel, the base plate having on its opposite sides webs (6) that are bent outwards, said webs having holds (7) for the purpose of joining adjacent insulating blocks by means of bolts. In this configuration, a damping or compensating element (8) is arranged between any two adjacent insulating blocks (1), said element likewise consisting of ceramic fibrous material, preferably of the same fibrous material as the inner layer of each insulating mat (2).

Furthermore, suspension hooks (9) are attached to the base plate (5) in a manner as to allow them to rotate. As illustrated in FIG. 2, these suspension hooks (9) are intended to be hooked into or suspended from holding bars (10) suspended from the U-shaped beams (11) of a furnace roof, removable gratings (12) being arranged between the beams (11).

In the example illustrated by FIG. 2, a row of insulating blocks (1) is arranged in the space between a row of reaction tubes (13) and burners (14), said tubes and burners only being shown schematically in FIG. 2. In the hooked-in state of the insulating blocks (1) as illustrated by FIG. 2, a retainer (15) is allotted to each suspension hook (9), the retainer being placed between the bent-over web (6) and the holding bar (10).

FIG. 2 further shows that each insulating mat (2) is held together in folded state for the purpose of facilitating assembly by means of paper bands (16) which burn away when the furnace is started up.

Figure 3:
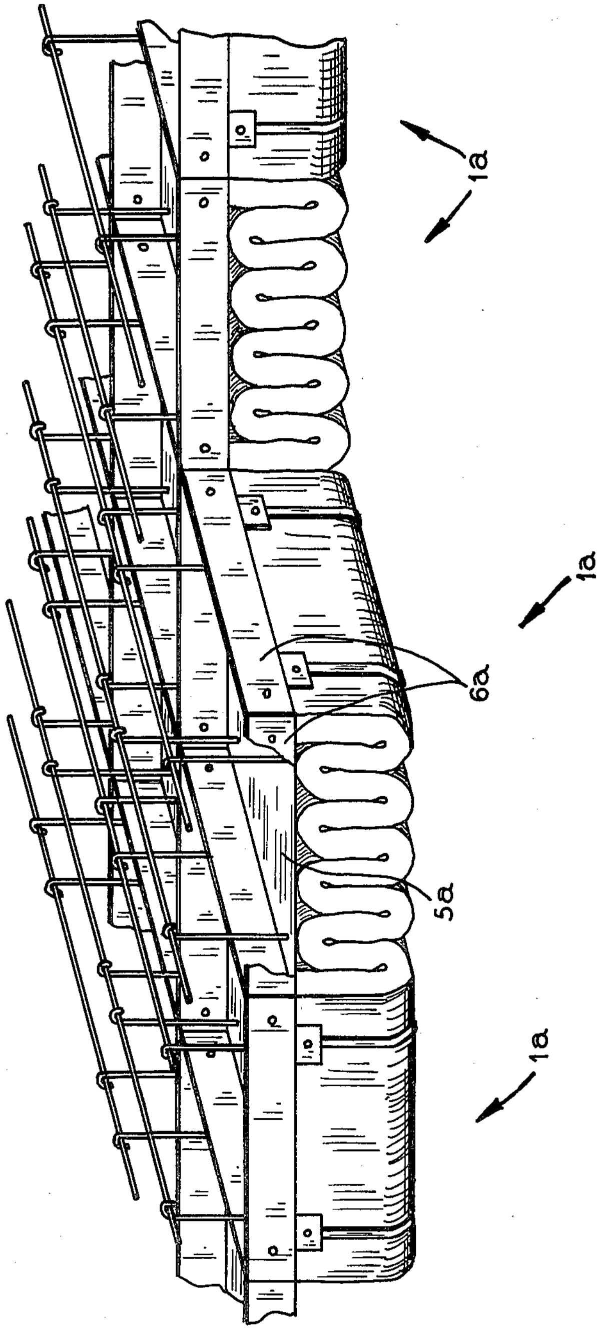
FIG. 3 is a schematic representation in perspective of a plurality of fully assembled insulating blocks for the total lining of a furnace roof according to the invention.

In the example illustrated by FIG. 3, an entire furnace roof is lined with insulating blocks (1*a*) that correspond to the insulating blocks (1) described above in all respects, except that each base plate (5*a*) is provided with bent-up webs (6*a*) on all four sides, such that an unbroken ceiling is formed in the form of cassettes, adjacent webs (6*a*) being joined by means of bolts passing through the fixing holes provided in said webs. The insulating blocks having a square base area, these are best arranged in the form of a checker-board, i.e., the folds of the insulating mats of adjacent insulating blocks being perpendicular to each other, a basic arrangement which is already known (DE-OS No. 22 31 658).

As can be seen from the examples described above, the inventive configuration permits the removal of a defective insulating block and its replacement by a sound insulating block within a few seconds by removing the furnace wall cover (12) opposite a defective insulating block, by unscrewing the fixing bolts from the webs of the affected insulating blocks and by removing the retainers (15), without thereby having to interrupt the operation of the furnace, whereafter the joining of the new insulating blocks to the adjacent insulating blocks and the re-installation of the retainers can proceed without undue hurry.

It goes without saying that the examples described can be modified by various means without deviating from the basic idea of the invention. Thus, the insulating blocks described can also be used for lining the side walls of a furnace. Moreover, instead of having a quadratic shape, it is possible to use hexagons of the honeycomb type, in which case six webs will be required, or any other polygonal shapes. Instead of using continuous holding bars for attaching the hooks arranged in the base plates, other means, such as lugs and the like can be provided on the furnace wall. Furthermore, the insulating mat can be fixed to the base plate by some method other than described, e.g., by the known carrying sections set into the extreme ends of insulating mat folds, as taught by DE-OS No. 26 35 623, and so forth.

We claim:

1. A lining for the inner walls of industrial furnaces comprising a plurality of insulating blocks, each block comprising an insulating mat which is folded in corrugated manner, said insulating mat being made of highly heat-resistant material, especially ceramic fibrous material; carrying elements penetrating the folds of the corrugations on one side of said insulating mat; a base plate provided on the outside of each said insulating block, said base plate having at least two webs extending outwardly and disposed on opposite sides of said base plate; means disposed on said base plate on the side opposite said webs for connecting said carrying elements to said base plate; and means rotatably attached to said base plate for suspending each said insulating block from the walls of the furnace, said fixing means comprise hooks and including holding means attached to the furnace walls, said holding means comprising holding bars and said carrying elements comprise at least two carrying bars that penetrate all folds of said insulating mat and said connecting means comprise lugs extending from said base plate for connecting said carrying bars to said base plate.

2. The invention according to claim 1, including a retaining element for locking said hooks to said holding bars.

3. The invention according to claim 2, wherein said retaining element comprises a locking bar inserted between the holding bars and the upper surface of the webs extending from said base plate.

4. The invention according to claim 1, including a damping insulating block element made of highly heat-resistant material disposed between and connected to the adjoining webs of adjacent insulating blocks.

5. The invention according to claim 1, wherein each said insulating mat is held in a folded state by means of bands depending from said base plate for facilitating of assembly of said insulating mat onto said base plate.

6. The invention according to claim 1, wherein said insulating mat comprises several layers of insulating material, said layers having different heat resistances in the direction towards the inside of the furnace with the layer nearest the inside of the furnace having the highest resistance to heat.

* * * * *